(12) United States Patent
Sack et al.

(10) Patent No.: US 9,404,552 B2
(45) Date of Patent: Aug. 2, 2016

(54) HYDRAULIC DAMPING CARTRIDGE

(71) Applicant: B-Labs AG, Biel (CH)

(72) Inventors: Stefan Sack, Bad Wiessee (DE); Andreas Felsl, Biel (CH)

(73) Assignee: B-Labs AG, Biel (CH)

( * ) Notice: Subject to any disclaimer, the term of this patent is extended or adjusted under 35 U.S.C. 154(b) by 0 days.

(21) Appl. No.: 14/280,300

(22) Filed: May 16, 2014

(65) Prior Publication Data

US 2014/0339030 A1 Nov. 20, 2014

(30) Foreign Application Priority Data

May 17, 2013 (DE) .......................... 10 2013 105 106
May 16, 2014 (DE) .......................... 10 2014 106 977

(51) Int. Cl.
*B60G 17/04* (2006.01)
*F16F 9/504* (2006.01)

(52) U.S. Cl.
CPC .............. *F16F 9/504* (2013.01); *F16F 2230/32* (2013.01)

(58) Field of Classification Search
CPC ......... F16F 9/504; F16F 9/512; F16F 9/3405; B62K 25/08; B62K 2025/048
See application file for complete search history.

(56) References Cited

U.S. PATENT DOCUMENTS

| 6,105,987 A * | 8/2000 | Turner .......................... 280/276 |
| 2003/0001358 A1* | 1/2003 | Becker et al. ................. 280/276 |
| 2009/0115159 A1* | 5/2009 | Sintorn ........................ 280/276 |
| 2009/0277736 A1* | 11/2009 | McAndrews et al. ......... 188/314 |
| 2010/0044975 A1* | 2/2010 | Yablon et al. ............... 280/5.503 |
| 2010/0117329 A1* | 5/2010 | Achenbach et al. .......... 280/276 |
| 2011/0083930 A1* | 4/2011 | Laird et al. .................... 188/275 |

* cited by examiner

*Primary Examiner* — Christopher Schwartz
(74) *Attorney, Agent, or Firm* — Boyle Fredrickson S.C.

(57) ABSTRACT

Disclosed is a damping cartridge with a rebound stage damping unit and a compression stage damping unit as well as an compensating volume for a damping medium. According to the present invention the compression stage unit is made up of a three-way unit with a high-speed-, a mid-speed- and a low-speed flow path. Furthermore the compensating volume is made up of a tube bladder, which at least partially encompasses the compression stage unit.

12 Claims, 4 Drawing Sheets

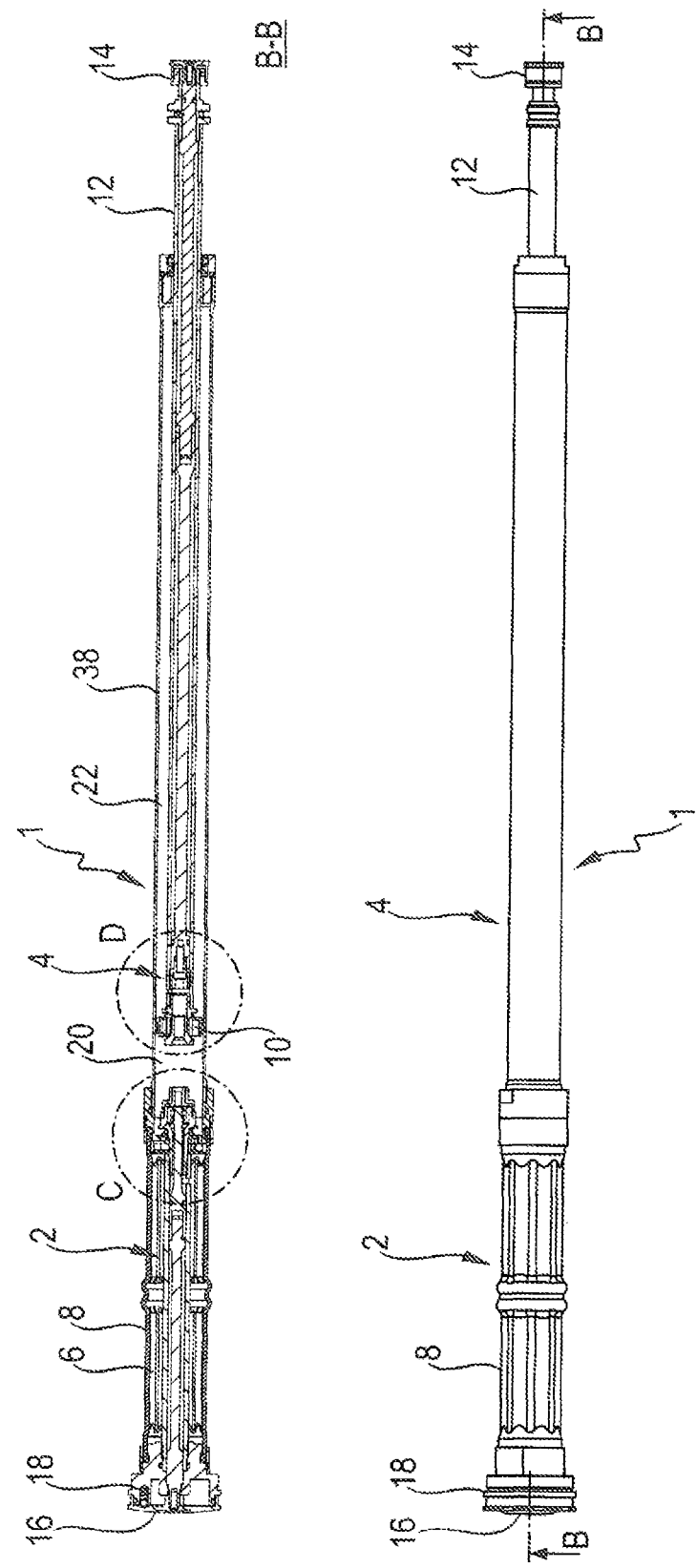

HYDRAULIC DAMPING CARTRIDGE

BACKGROUND OF THE INVENTION

1. Field of the Invention

The invention concerns a hydraulic damping cartridge as outlined by the claims.

2. Description of Related Art

There are numerous known solutions in the market, in which a damping cartridge is constructed with an adjustable rebound stage damping. Higher quality hydraulic damping cartridges are also fitted with an additional adjustable compression stage damping unit, so that a suspension fork (air spring or mechanical spring) fitted with such a damping cartridge can be flexibly adjusted to different conditions of use.

The damping of such damping cartridges is in principle achieved using a pressure medium, preferably oil, which is forced through choke valves during compression and extension strokes, whereby the choke valve cross section of these choke valves can be varied. The displaced pressure medium is moved to a compensating volume or is fed from this. For this, most scenarios rely on a gas or an air cushion, which is separated from the pressure medium by means of an internal floating piston or which is located in a compensating volume into which the pressure medium is displaced. Solutions with internal floating pistons require considerable technical costs in manufacturing. Solutions without physical separation of air and pressurizing medium run the risk of both media become mixed or of the pressure medium foaming with an accompanying deterioration of the damping function.

Especially with longer travel suspension forks (with 130 mm stroke or longer) it is important to prevent an uncontrolled sagging on the compression stroke. This is achieved by means of an adjustable compression stage damping, which can be externally adjusted to change the damping characteristics.

Known damping cartridges with adjustable rebound and compression stage damping are, as a rule extremely complex constructions and are not suited for retro-fitting to existing suspension forks.

SUMMARY OF THE INVENTION

In contrast to this the task of the invention is to create a damping cartridge, which dispels these disadvantages.

A damping cartridge with the characteristics of Patent claim 1 resolves this task.

Further advantageous modifications of the invention are the subject matter of the sub-claims According to the present invention a hydraulic damping cartridge is made up of a rebound damping unit and a compression damping unit as well as a compensating volume for a pressurizing medium, in the following known as damping medium. The compression damping unit is made up of a three-way unit, whereby "three-way unit" describes a compression stage in which different flow paths exist for a high-speed mode, a mid-speed mode and a low-speed mode.

The choke valve cross section of the low-speed damping mode is adjustable and dampens movements in which the suspension fork is compressed at comparatively low speeds. In this way slow fork movements such as brake diving or bobbing whilst climbing can be controlled and damped. In order to make a more sensitive fork actuation possible during faster fork movements, depending on pressure or speed additional choke valve cross sections can be activated during mid-speed fork movements (mid-speed damping mode) or during very fast fork movements (high-speed damping mode) so that the fork achieves optimum rider comfort and ensures that the front wheel stays in contact with the ground.

Such a three-way damping mode allows a proper cushioning to take place even when the low-speed choke valve cross section is almost or completely shut off, as in such a case the damping medium can instead flow via the high-speed/or mid-speed paths via the corresponding choke valve cross sections in order to provoke the damping. This means that for example even when the suspension fork is loaded with a fast hit from a bump a smooth actuation of the fork is ensured. This prevents damage to internal components of the fork as peak compression loads are reduced, which occur with conventional solutions when the low-speed choke valve cross section is shut off, whereby it should be noted that the compression speed of the fork under such extreme pressures can be as high as 5 m/s.

With one embodiment of the invention the choke valve cross sections (low-speed-, mid-speed- and high-speed-flow path) are not, as per prior art, situated in a head portion but mainly in the connecting section between the rebound damping unit and the compression damping unit. In one specific solution the choke valve cross sections are situated on a compression stage main body onto which a cylinder of a rebound stage damping unit is also located.

With conventional solutions the compression damping function is frequently situated in the head portion in which additional elements then must be present in order to bleed air from the damping cartridge thus the structure is very complex. The present invention is not affected by this disadvantage, as the choke valve cross sections of the compression stage unit are not situated in the head portion. A further advantage of the system according to the present invention lies in that any air possibly entering the damping cartridge can collect in the head area thus remaining in the compensating volume and not being forced through the choke valve cross sections together with the damping medium. However, in conventional cartridges with choke valve cross sections located in the head portion the damping performance is negatively affected by this head end located choke valve cross section.

With one embodiment of the invention the choke valve cross section for the mid-speed flow path is controlled open and close through a mid-speed ring. In a preferred embodiment said mid-speed ring is encompassed by a ring-formed lift plate of the high-speed compression stage damping. On its part the mid-speed ring encompasses a compression stage rod or a valve element of the low-speed flow path which is mounted to or co-axially arranged with said compression stage rod.

The mid-speed ring and/or the lift plate lie jointly on a frontal surface of the compression stage main body in which the mid-speed choke valve cross section and the high-speed choke valve cross section is situated.

Preferably the damping cartridge is modularly constructed, wherein the rebound stage damping unit and the compression stage damping unit are axially offset and interchangeably arranged in the cartridge. In a preferred embodiment the rebound stage damping unit is at least conceived as a one-way unit but preferably as a two-way unit.

With one embodiment of the invention the compensating volume is limited by a tube bladder, which essentially is arranged in an extension of the rebound stage unit.

The special advantage of such a solution is that this cartridge is very compact in both axial and radial direction as well as being simple in its construction as no additional air volume and corresponding means of sealing need to be provided.

With one especially preferred embodiment of the invention the tube bladder is almost completely integrated in the compression stage damping unit and can be axially penetrated by the compression stage rod, which reaches between a cartridge head mounted adjustment mechanism and a compression stage main body.

Correspondingly the tube bladder can be positioned between a cartridge head with an adjustment mechanism on one side and a compression stage main body as well as the rebound stage damping unit on the other side.

The assembly of the damping cartridge is particularly simple if the tube bladder is attached by means of lock-rings to the compression stage main body and to the cartridge head.

The tube bladder is preferably manufactured from plastic material.

The compensating volume can principally be provided by radial deformation of the tube bladder.

The closing of the choke valve cross sections (high-speed, mid-speed and low-speed) is carried out for example by means of shim devices or shim stacks, which either close the choke valve cross section directly or pressurize a shutting element such as a lift plate or a mid-speed ring.

With one alternative the tube bladder is partially formed like a boot with circumferential expansion folds.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred embodiment of the invention will in the following be explained more closely by means of schematic drawings. The following are shown:

FIG. 1 an overall view of a damping cartridge according to the present invention and a cut through the cartridge along the line B-B in FIG. 1, FIG. 2 a Detail D of the damping cartridge according to FIG. 1, FIG. 3 a Detail C of the damping cartridge according to FIG. 1, FIG. 4 a three dimensional diagram of an compensating volume formed by a tube bladder, and FIG. 5 a schematic diagram of the tube bladder to clarify the assembly of a rebound stage damping unit.

DETAILED DESCRIPTION OF THE DRAWINGS

Figure 3:
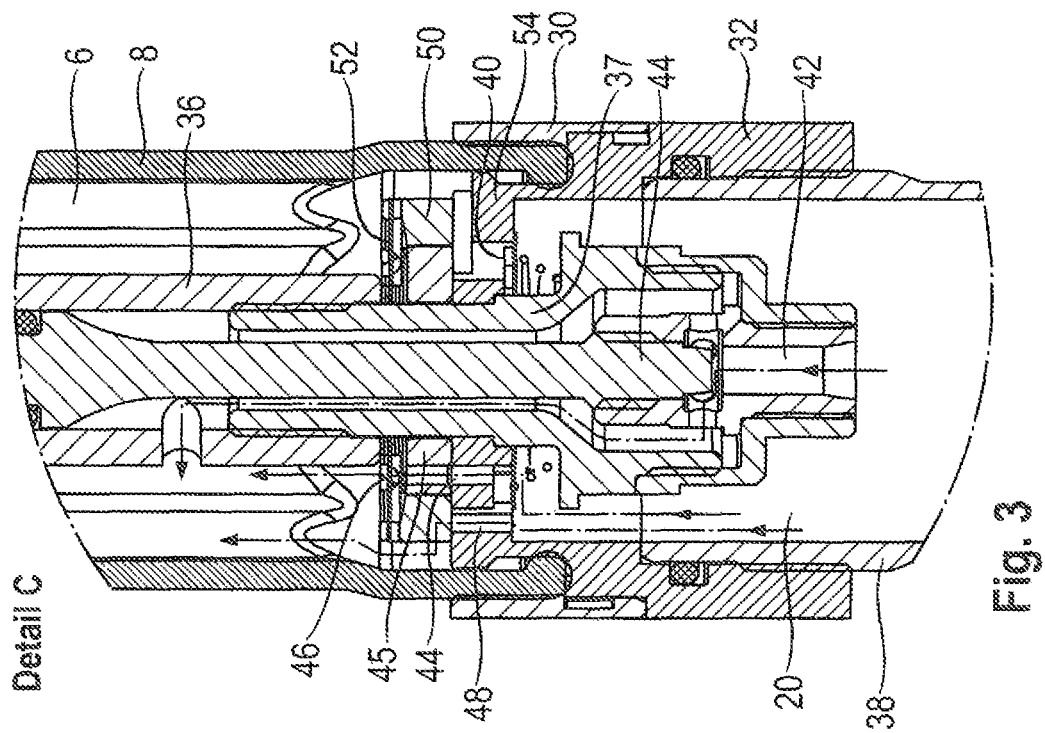

In FIG. 1 below, a side view of a damping cartridge 1 according to present invention of an unseen suspension fork is shown. Such a damping cartridge 1 is in principle made up of a compression stage damping unit 2 to control the compression movement of the fork and a rebound stage damping unit 4 to control the extension movement of the suspension fork. The compression stage unit 2 is at least in sections encompassed by a tube bladder 8, which radially limits a compensating volume 6. On the rebound stage side a piston 10 is provided whose piston rod 12 protrudes in the axial direction from the damping cartridge 1.

The damping characteristics of the rebound stage unit 4 can be adjusted by means of a rebound stage adjustment device 14 and the damping characteristics of the compression stage unit through an additional adjustment device 16. The previously mentioned compression stage adjustment device 16 is arranged at a cartridge head 18.

The piston 10 separates two oil chambers 20, 22 provided for the damping medium, which as per the following description are in directly or indirectly fluidically connected to the in the compensating volume 6.

Figure 2:
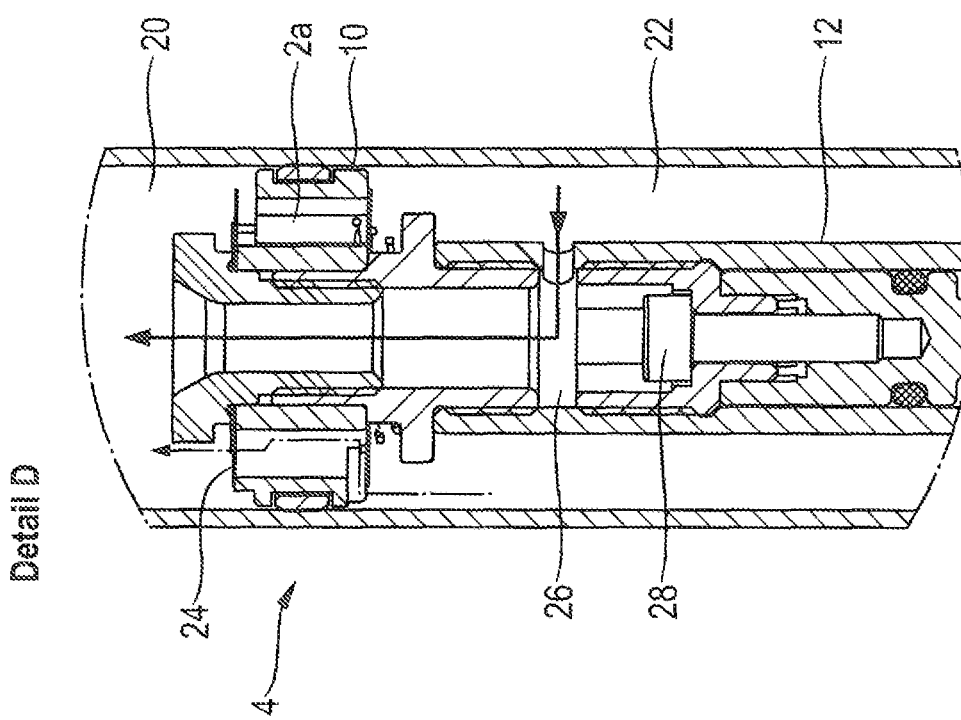

FIG. 2 illustrates the detail D of the rebound stage damping unit 4. Said rebound stage damping unit 4 is designed as a 2-way unit with a low-speed flow path and a high-speed flow path for the damping medium. The low-speed flow path is represented by a solid lined arrow. During faster extension movements the dotted lined high-speed flow path is controlled opened, so that pressure medium can flow from oil chamber 22 to oil chamber 20. The choke valve cross section of the high-speed flow-path of the rebound stage damping unit 4 is determined by a shim stack 24. Said shim stack 24 does not block the choke valve cross section in the low-speed mode, as it clears a smaller cross section at lower speeds and provides an ever larger cross section at higher speeds by bending open. The influence of the high-speed rebound stage on the low-speed range is low due to the low bending open of the shim stack 24. The opening cross-section of the low-speed flow path can be set by means of a rebound stage choke valve 26, whose opening cross-section can be adjusted by an adjustment screw 28, which can be adjusted by the rebound stage adjustment device 14. A further compression stage control valve 29 is located in the region of the rebound stage damping unit 4.

FIG. 3 shows the detail C of the compression stage damping unit 2.

In this illustration one can see the tube bladder 8, which is fastened to the compression stage main body 32 by means of a lock-ring 30 and to the cartridge head 18 in a similar manner. This tube bladder 8 encompasses a compression stage rod 36. The compression stage main body 32 is connected to a main cylinder 38 in which the piston 10 is guided, According to the illustrations in FIGS. 1 to 3 a corresponding amount of oil volume is displaced from oil chamber 22 by the piston rod 12 which is pushed into the main cylinder 38 during compressing of the damping cartridge 1. Said oil volume (damping medium) is, according to the speed of the compression movement, pressed through up-to three compression stage choke valve cross sections, wherein the accompanying decrease in pressure leads to a damping of the movement. The oil displaced from compression oil chamber 20 reaches the compensating volume 6, which is encompassed by the tube bladder 8, via the choke valve cross sections. Furthermore piston 10 is provided with a rebound stage control valve 40 in form of a cheek valve, which opens very slightly during compression and allows a low resistance return of oil to that side of the piston 10 which is the far side with respect to the compression stage in order to keep the rebound stage sided oil chamber 22 filled. The opened control valve cross section is constructed for the maximum possible size so that a fast return oil flow does not cause disruptive cavitation, which otherwise can occur through a closed low-speed compression stage choke valve cross section (low-speed compression stage choke valve 26).

In the embodiment illustrated the rebound stage choke valve 26 is fitted with an adjustable needle and an externally accessible controller connected to it, which can control this rebound stage choke valve cross section up-to a fully closed cross section. The adjustment of this needle can as mentioned before be achieved by means of adjustment device 14.

As explained in the following the compression stage unit is designed as a three-way unit with a high-speed-compression stage choke valve in a high-speed flow path, a mid-speed-compression stage choke valve in a mid-speed flow path and a low-speed flow path.

The low-speed flow path (low-speed compression stage) is illustrated in FIG. 3 by a solid-lined arrow. The choke valve cross section of this flow path is adjusted by means of a choke valve of the low-speed compression stage 42 with an adjustable choke valve needle 43.

The mid-speed flow path is shown as a dotted line in FIG. 3. The choke valve cross section of this mid-speed flow path is adjusted by a mid-speed-compression stage 44. It is composed of a shim based valve whereby a shim 46, which can bend in the compression direction, affects a mid-speed ring 45. The shim 46 already bends slightly open in the low-speed range, so that the mid-speed ring 45 is already slightly open. At higher speeds shim 46 is bent more and more open thus providing a comparatively wide cross section in the mid-speed range.

The choke valve cross section of the high-speed flow path is also limited by a shim based high-speed compression stage 48, whose opening cross section is initially closed by a lift plate 50, which is spring-preloaded by a shim stack 52.

In the high-speed mode the lift plate 50 raises from its valve seat and opens the high-speed flow path as shown by the dotted line. Thus during the low-speed range the mid-speed ring 45 already opens due to the shim 46 not being pre-loaded, whilst due to the spring preload the lift plate 50 can only raise in the high-speed range.

As mentioned the high-speed compression stage choke valve cross section 48 is shim based but in contrast to the mid-speed compression stage choke valve cross section it is spring pre-loaded. The high-speed compression stage 48 therefore only opens after a pre-defined damping force has been exceeded and in doing so provides an additional flow cross-section for the oil.

The mid-speed compression stage 44 is, as mentioned, realised by means of one or more shims, which cover corresponding channels without being pre-loaded and only provide a speed-sensitive choke valve cross-section through their own defined inherent rigidity.

The channels of the high-speed- and mid-speed compression stages open out into a front face of the compression stage main body 32. These opening areas are covered over by the mid-speed ring 45 and the lift plate 50 respectively. The ring formed lift plate 50 encompasses the mid-speed ring 45, which respectively encompasses the compression stage rod 36 as well as a valve element 37 of the low-speed compression stage, which is fixed to it.

By implementing a compression stage damping only fitted with a low-speed- and as a rule a pre-loaded high-speed-compression stage, the suspension response of the whole unit if the low-speed choke valve cross section is fully closed is characterised by a jerking movement as an expansive force must be exceeded to overcome and open the pre-loaded spring of the high-speed choke valve cross section. The available mid-speed compression stage according to the invention prevents this initial jerking effectively and offers a smooth suspension response even when the low-speed compression stage is fully closed.

The above described control valve 40 is arranged inside the compression stage unit and due to its embodiment as a check valve it only allows the damping medium to flow in one direction. During compression of the damping cartridge 1 this return valve 40 closes and forces the fluid through the above described compression stages (flow paths). During extension of the damping cartridge 1 the control valve 40 opens almost entirely free of resistance and due to a very large flow cross-section it allows an un-damped and cavitation free return flow of the damping medium from the compensating volume 8.

When the cartridge is extended the compression stage control valve 29 simultaneously closes so that the damping medium from oil chamber 22 flows back through the low-speed rebound stage flow path and the high-speed rebound stage flow path into the oil chamber. The damping medium flows simultaneously via the opened control valve 40 from the compensating volume 6 into the oil chamber 20, wherein the loss in pressure is minimal due to the large opening cross section of return valve 40.

As illustrated, the low-speed rebound stage is designed as a choke valve which is axially adjustable by an externally accessible controller and which in the embodiment shown can completely shut the choke valve cross section. The high-speed rebound stage choke valve cross-section is realised via channels fitted with variable strength shims, which provide a speed dependent choke valve cross section and allow a high flow of oil especially at higher speeds.

Figure 4:
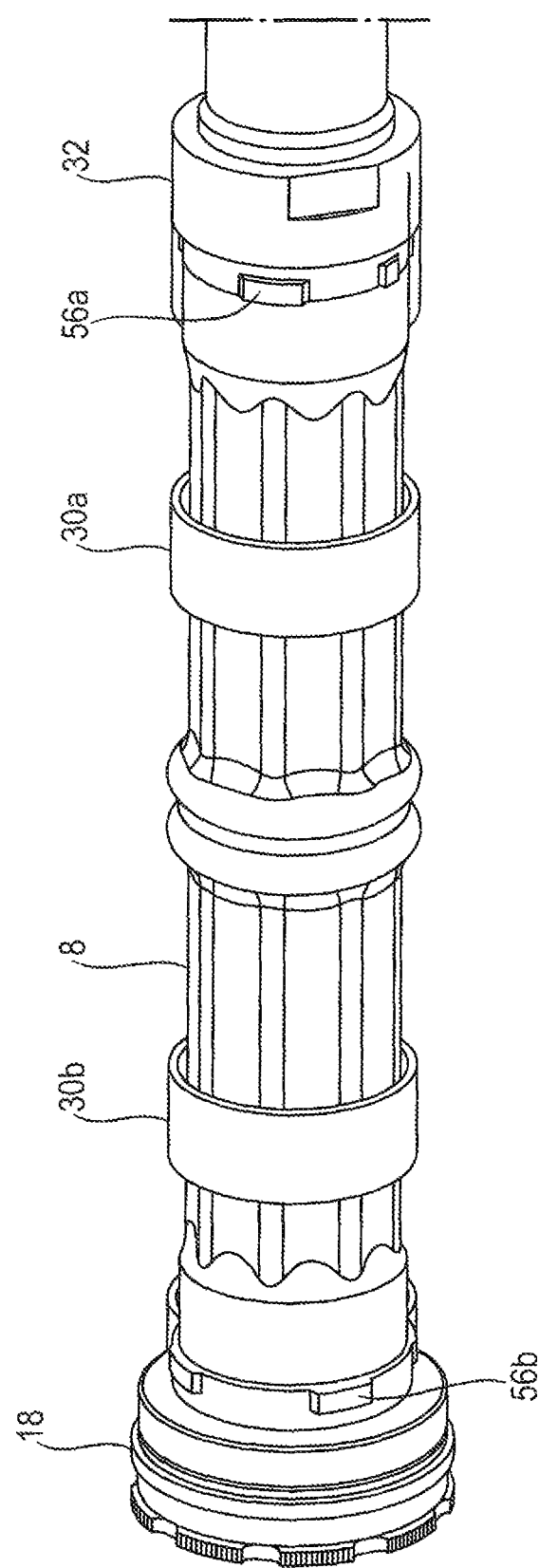

FIG. 3 shows a three dimensional illustration of the compression stage sided end-section of the damping cartridge 1. One can see the tube bladder 8, which extends between the cartridge head 18 and the compression stage main body 32. On the compression stage main body 32 as well as on the cartridge head 18 bladder tube fittings 54 (see FIG. 5) are provided, which are plugged force- and form-fitted onto the end-sections of the tube bladder 8. Locking is achieved by clamp lock-rings 30a and 30b. These are shown as per FIG. 4 in a non-locked state.

The clamp lock rings 30a and 30b are both fitted with bayonet locking elements 55 (FIG. 5) which work together with a corresponding bayonet profile 56a, 56b on the compression stage main body 32 and the cartridge head 18 respectively.

Figure 5:
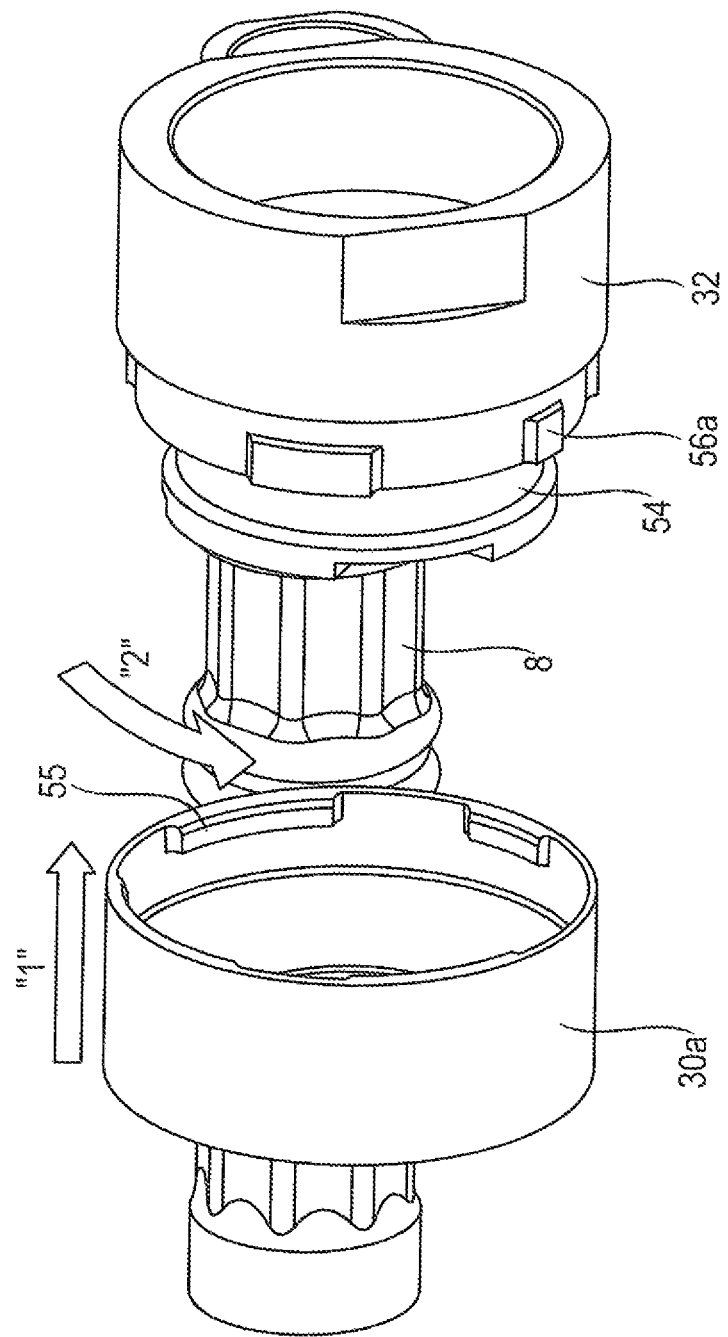

The assembly of the tube bladder 8 and thus the realisation of the compensating volume 6 is as simple as can be—the tube bladder 8 is slid onto both the bladder fittings, whereby the clamp lock-rings 30a and 30b are initially arranged in the position shown. For final locking the clamp lock-rings 30a and 30b as shown in FIG. 5 are initially slid as per the direction of the arrow "1" towards the related component, shown here the compression stage main body 32 and then rotated in the direction of the arrow "2" to activate the locking clamp of the bayonet.

The connection of the rebound stage unit 4 to the compression stage unit 2 is via, the compression stage main body 32. This is designed in such a way that both units are interchangeable, so that by means of corresponding choice of axial length and/or diameter the units of the cartridge can be adapted to different spring geometries.

Disclosed is a damping cartridge with a rebound stage damping unit and a compression stage damping unit as well as a compensating volume for a damping medium. According to the present invention the compression stage damping unit is made up of a three-way unit with a high-speed-, a mid-speed- and a low-speed flow path. Furthermore the compensating volume is made up of a tube bladder, which at least partially encompasses the compression stage unit and is fixed by means of lock-rings.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A hydraulic damping cartridge for a suspension fork, with a rebound stage damping unit and a compression stage damping unit as well as a compensating volume for a damping medium, wherein the compression stage damping unit is a 3-way unit with a high-speed flow path, a mid-speed flow path, and a low-speed flow path for said damping medium constituting a high-speed-, a mid-speed- and a low-speed-mode, wherein channels of the high-speed and mid-speed compression stages open at a front face of a compression stage main body and wherein the opening areas of said channels are covered by a mid-speed ring and a lift plate, respectively;

and wherein the lift plate encompasses the mid-speed ring.

2. The damping cartridge of claim 1, wherein the compensating volume is constrained with a tube bladder, which is axially offset to the rebound stage damping unit adjoining the area of the compression stage damping unit.

3. The damping cartridge of claim 2, wherein the tube bladder at least partially encompasses the compression stage damping unit.

4. The damping cartridge of claim 3, wherein the tube bladder is fixed to the compression stage damping unit by means of lock-rings.

5. The damping cartridge of claim 4, wherein coupling elements which can be interlocked with the lock-rings and between which the tube bladder extends are envisaged on the compression stage side.

6. The damping cartridge of claim 4, wherein the lock-rings are designed with a bayonet fitting.

7. The damping cartridge of claim 1, wherein the three flow paths are constrained with a low-speed choke valve cross section, a mid-speed choke valve cross section and a high-speed choke valve cross section respectively whose flow cross section is controlled by dedicated valve elements.

8. The damping cartridge of claim 7, wherein shim elements are utilised to one of:
   substantially close off opening cross sections without preloading; and
   to pressurize closing elements dedicated to the respective opening cross section.

9. The damping cartridge of claim 8, wherein said shim element is one of the high-speed lift plate and the mid-speed ring.

10. The damping cartridge of claim 7, wherein the valve elements have spring pre-loaded valve bodies.

11. The damping cartridge of claim 1, wherein the damping cartridge is constructed modularly and the rebound stage damping unit and the compression stage damping unit are axially offset.

12. The damping cartridge of claim 1, wherein the rebound stage damping unit is designed as one of a one-way unit and a two-way unit.

* * * * *